(12) United States Patent
Allen et al.

(10) Patent No.: US 6,294,645 B1
(45) Date of Patent: *Sep. 25, 2001

(54) DRY-STRENGTH SYSTEM

(75) Inventors: Anthony J. Allen; Elliott Echt, both of Wilmington, DE (US); William W. Maslanka, Landenberg, PA (US); Jeffrey C. Peters, Kalamazoo, MI (US)

(73) Assignee: Hercules Incorporated, Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,805

(22) Filed: Jul. 25, 1997

(51) Int. Cl.[7] ............ C08G 69/48; C08G 73/02; C08L 79/02

(52) U.S. Cl. ......... 528/339.3; 528/341; 528/403; 528/480; 528/486; 528/493; 528/503; 525/430; 525/435; 525/436; 524/420; 524/538; 524/31; 523/414; 523/416; 523/417; 523/418; 523/420

(58) Field of Search .................... 528/341, 339.3, 528/480, 486, 403, 493, 503; 523/414, 416, 417, 418, 420; 524/420; 525/430, 435, 436

(56) References Cited

U.S. PATENT DOCUMENTS

| | | | |
|---|---|---|---|
| 3,049,469 | 8/1962 | Davison | 162/164 |
| 3,058,873 | 10/1962 | Keim et al. | 162/164 |
| 3,332,834 | 7/1967 | Reynolds | 162/164 |
| 4,341,887 | 7/1982 | Buriks et al. | 526/263 |
| 4,643,801 | 2/1987 | Johnson | 162/164.1 |
| 4,824,523 | 4/1989 | Wagberg et al. | 162/164.1 |
| 4,975,499 | 12/1990 | Bachem et al. | 525/430 |
| 5,019,606 | 5/1991 | Marten et al. | 523/414 |
| 5,318,669 | 6/1994 | Dasgupta | 162/164.3 |
| 5,338,406 | 8/1994 | Smith | 162/168.2 |
| 5,338,407 | 8/1994 | Dasgupta | 162/168.3 |
| 5,502,091 | 3/1996 | Dasgupta | 524/55 |
| 5,585,456 | 12/1996 | Dulany et al. | 528/332 |
| 5,641,855 | 6/1997 | Scherr et al. | 528/310 |

FOREIGN PATENT DOCUMENTS

| | | | |
|---|---|---|---|
| 1110019 | 10/1981 | (CA) | D21H/3/36 |
| 4105919A1 | 8/1992 | (DE) | D21H/21/14 |
| 0 802 215 | 4/1997 | (EP) . | |
| 52-148210A | 12/1977 | (JP) | D21H/3/58 |
| 94/14873 | 7/1994 | (WO) . | |

*Primary Examiner*—P. Hampton-Hightower
(74) *Attorney, Agent, or Firm*—Robert P. O'Flynn O'Brien; Gary A. Samuels

(57) ABSTRACT

The invention relates to resin systems useful for imparting dry-strength to paper without substantially increasing the paper's wet-strength wherein the resin system comprises a cationic component and an anionic component. The invention also relates to the process for incorporating these resin systems into paper and the paper produced containing the resin systems.

14 Claims, 2 Drawing Sheets

DRY-STRENGTH SYSTEM

FIELD OF THE INVENTION

The invention relates to resin systems useful for imparting dry-strength to paper. The invention also relates to a process for incorporating these resin systems into paper and paper produced containing the resin systems.

BACKGROUND OF THE INVENTION

It is well known to add certain resins to paper, usually during the paper-making process, to improve dry-strength of the resultant paper. It is also well known to add certain resins to paper to improve wet-strength of the resultant paper. It is also well known that certain additives increase both a paper's wet-strength and and dry-strength. However, it is not always desirable that paper with increased dry-strength also exhibit an increased wet-strength since increasing a paper's wet-strength makes paper more difficult to repulp. If it is difficult for a paper product to be repulped, the papermaker will find it difficult to reprocess the material thereby increasing the amount of unusable waste associated with the papermaking process.

Many polymers that improve a paper's dry-strength are anionic under normal papermaking conditions, e.g., sodium carboxymethylcellulose, carboxymethyl guar, and copolymers of acrylamide and acrylic acid or sodium acrylate. A cationic compound may be used to retain these anionic substances on the pulp fibers which are themselves anionic by nature. These cationic compounds may be wet-strength agents such as polyaminoamide-epichlorohydrin resins, highly cationic polymers such as poly (diallyldimethylammonium chloride), polymers of dimethylamine and epichlorohydrin, modified starches, aluminum compounds, etc.

In U.S. Pat. No. 5,338,406 to Smith, a dry-strength system for a "water-soluble, linear, high molecular weight, low charge density cationic polymer having a reduced specific viscosity greater than two deciliters per gram (>2 dl/g) and a charge density of 0.2 to 4 milliequivalents per gram" with "at least one water-soluble, anionic polymer having a charge density less than 5 meq/g" is disclosed. The polyelectrolyte complex of Smith is useful as an additive for providing dry-strength to all types of paper, particularly for those papers which are produced using unbleached pulp.

In U.S. Pat. No. 5,338,407 to Dasgupta, a process for enhancement of paper dry-strength without reducing its softness is disclosed. The process comprises adding a mixture of an anionic carboxymethyl guar, carboxymethyl bean gum or carboxymethyl hydroxyethyl guar with various cationic additives to a bleached pulp furnish. The cationic additive may be a polyamidoamine-epichlorohydrin resin. If the cationic additive is a wet-strength resin, the paper's dry-strength is enhanced without reducing its softness. Additionally, the wet-strength of the paper is increased.

In Canadian Patent No. 1,110,019, "a process for manufacturing paper having improved dry-strength which comprises mixing an essentially alum-free pulp slurry with a water-soluble cationic polymer and subsequently adding a water-soluble anionic polymer to the essentially alum-free pulp slurry" is disclosed.

In addition to the above, polyamidoamine-epichlorohydrin resins have been used extensively as wet-strength agents for paper. Typically, these resins are prepared in a two-step process. In a first step, a polyamidoamine prepolymer is prepared from a diacid (e.g. adipic acid) and a polyamine (e.g. diethylenetriamine). In a second step, the polyamidoamine prepolymer is reacted with epichlorohydrin in an amount equal to or greater than the amount of secondary amine groups in the prepolymer. A small amount of epichlorohydrin reacts to effect branching of the prepolymer, accompanied by an increase in molecular weight. However, a majority of the epichlorohydrin reacts with the prepolymer to give reactive functional groups, specifically, either aminochlorohydrin or azetidinium. It is well known to those skilled in the art of papermaking that the above-described polyamidoamine-epichlorohydrin resins may be used in combination with anionic acrylamides or anionic cellulose derivatives. However, papers containing these combinations exhibit increased wet-strength as well as increased dry-strength, thereby making papers containing these combinations difficult to repulp.

SUMMARY OF THE INVENTION

The invention relates to a dry-strength system for paper comprising: a cationic component and an anionic component. The cationic component comprises a reaction product of an intralinker and a polyamidoamine. The intralinker to amine is in a ratio of about 0.75:1 or less on a molar basis. Preferably, the intralinker to amine is in a ratio of between about 0.02:1 to about 0.75:1, more preferably the intralinker to amine is in a ratio of between about 0.10:1 to about 0.40:1, more preferably about 0.20:1 to about 0.30:1.

The cationic component comprises a reaction product of an intralinker and a polyamidoamine wherein the polyamidoamine prior to reacting with the intralinker has a reduced specific viscosity of less than about 0.125 dl/g. Reduced specific viscosity ("RSV") is used as a measure of the polyamidoamine prepolymer's molecular weight. Higher RSV values are indicative of higher molecular weights. Preferably, the polyamidoamine prior to reacting with the intralinker has a reduced specific viscosity of 0.05 to about 0.125 dl/g. More preferably, the polyamidoamine prior to reacting with the intralinker having a reduced specific viscosity of 0.065 to about 0.1 dl/g, more preferably, a reduced specific viscosity of 0.07 to about 0.09 dl/g.

The intralinker may be selected from the group consisting of epihalohydrins and diepoxides.

In one embodiment, the cationic component may comprise a cationic polyamidoamine epihalohydrin polymer. When the cationic component comprises a cationic polyamidoamine epihalohydrin polymer, the intralinker comprises epihalohydrin. The epihalohydrin may be selected from the group consisting of epichlorohydrin, epibromohydrin, epiiodohydrin, epifluorohydrin and alkyl-substituted epihalohydrins. Preferably, the epihalohydrin comprises epichlorohydrin.

In another embodiment, the intralinker may be a diepoxide. The intralinker may be selected from the group consisting of 1-bromo-3,4-epoxybutane, chloroepoxyhexane, and iodoepoxyisobutane, ethylene glycol diglycidyl ether (i.e., EGDGE) and 1,4-butanediol diglycidyl ether (i.e., BDDGE), 1,2,7,8-diepoxyoctane, 3-(bis (glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether.

The anionic component comprises an anionic component consisting of copolymers of acrylamide and at least one member selected from the group consisting of acrylic acid, itaconic acid, methacrylic acid and 2-acrylamido-2-methyl-1-propanesulfonic acid and salts thereof. Alternatively, the anionic component comprises an anionic component selected from the group consisting of carboxylmethylcellulose, carboxymethyl guar, alginic acid, pectin, poly(2-acrylamido-2-methyl-1-propanesulfonic acid), and salts thereof. Preferably, the salts of the anionic component are the sodium salts thereof.

Alternatively, the anionic component may be an amphoteric polymer having a net negative charge. The amphoteric polymer comprising a polymer of acrylamide, at least one anionic monomer selected from the group consisting of acrylic acid, itaconic acid, methacrylic acid and 2-acrylamido-2-methyl-1-propanesulfonic acid and salts thereof and at least one cationic monomer selected from the group consisting of methacryloyloxyethyltrimethylammonium chloride (MTMAC), methacryloyloxyethyltrimethylammonium sulfate (MTMMS), acryloyloxyethyltrimethylammonium chloride (ATMAC), methacryloyloxyethylbenzyldimethylammonium chloride (MBMAC), dimethylaminoethylmethacrylate (DMAEMA) and salts thereof, 3-(methacrylamido)propyltrimethylammonium chloride (MAPTAC), diallyldimethylammonium chloride (DADMAC), and diallyldiethylammonium chloride (DADEAC).

The ratios of anionic and cationic resins in the dry-strength system may range from about 1/20 to 20/1, preferably from about 4/1 to 1/4, and most preferably from about 2/3 to 3/2.

DETAILED DESCRIPTION OF THE INVENTION

This invention pertains to a dry-strength system which provides dry-strength to paper while not substantially increasing the paper's wet-strength and comprises a cationic component and an anionic component. The cationic component comprises a reaction product of an intralinker with a water-soluble polyamidoamine comprised of a dicarboxylic acid and a polyamine containing secondary and/or tertiary amines. The intralinker and amine are reacted with one another in a ratio. This ratio expressed on a molar basis is about 0.75:1 or less intralinker to amine. The amines of the reaction product may be either secondary or tertiary amines. Preferably, the ratio of intralinker to amine is between about 0.10:1 to about 0.40:1, more preferably 0.20:1 to about 0.30:1.

One aspect of the invention pertains to dry-strength systems in which a water-soluble polyamidoamine's molecular weight, as measured by the polyamidoamine's RSV, is controlled to a level of less than about 0.125 dl/g.

In one embodiment of the invention, the cationic component may be a cationic polyamidoamine epihalohydrin polymer, where the intralinker comprises an epihalohydrin. Preferably a cationic polyamidoamine comprises epichlorohydrin polymer where the intralinker is epichlorohydrin.

The cationic polyamidoamine epihalohydrin polymer comprises a reaction product of a low RSV water soluble polyamidoamine comprised of a dicarboxylic acid and a polyamine with secondary and/or tertiary amines present in the polyamidoamine and an intralinker. The RSV of the cationic component may be less than about 0.125 dl/g, preferably in the range of about 0.05 dl/g to about 0.125 dl/g, preferably about 0.06 dl/g to about 0.10 dl/g, more preferably about 0.06 dl/g to about 0.09 dl/g.

Figure 1:
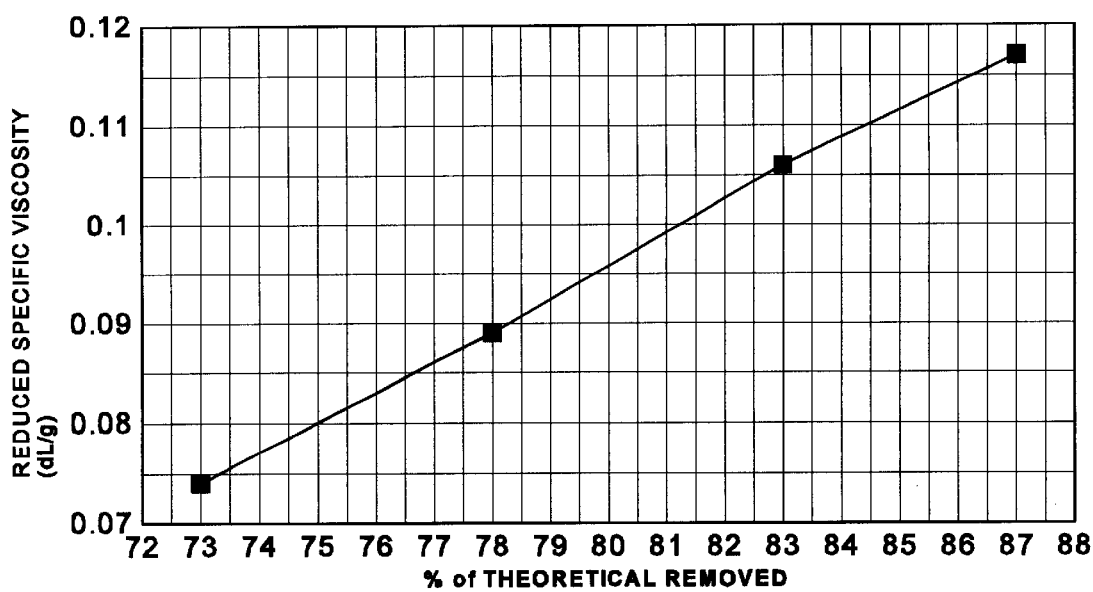
FIG. 1 is a graph depicting the relationship between a polyamidoamine's molecular weight as indicated by its reduced specific viscosity ("RSV") and the amount of distillate (water) removed during the condensation reaction.

In this embodiment of the invention, the cationic polyamidoamine epichlorohydrin polymer comprises poly(adipic acid-co-diethylenetriamine) reacted with epichlorohydrin at a mole ratio of less than 0.75 moles of epichlorohydrin per mole of amine, preferably at a mole ratio of less than 0.50 moles of epichlorohydrin per mole of amine, alternatively at a mole ratio of less than about 0.25 moles of epichlorohydrin per mole of amine. In one embodiment of the invention, the polyamidoamine is poly(adipic acid-co-diethylenetriamine). In this embodiment, the polyamidoamine's molecular weight is controlled by regulating the amount of condensation water removed during the reaction of the dibasic acid and the polyamine. FIG. 1 is a graph depicting the relationship between a polyamidoamine's molecular weight as indicated by its RSV and the amount of distillate (water) removed during the condensation reaction. The amount of water removed refers to a percentage of the theoretical amount of water present for a complete amidization of all the carboxylic acids present.

In another embodiment of the invention, the cationic component may also be an intralinked polyamidoamine, described in U.S. patent application Ser. No. 08/634,226 (now U.S. Pat. No. 5,786,429), incorporated herein by reference in its entirety. This highly-branched structure results from reacting a prepolymer of controlled molecular weight, especially a prepolymer of predetermined low molecular weight, with the requisite amount of epichlorohydrin or other intralinking agent.

Figure 2:
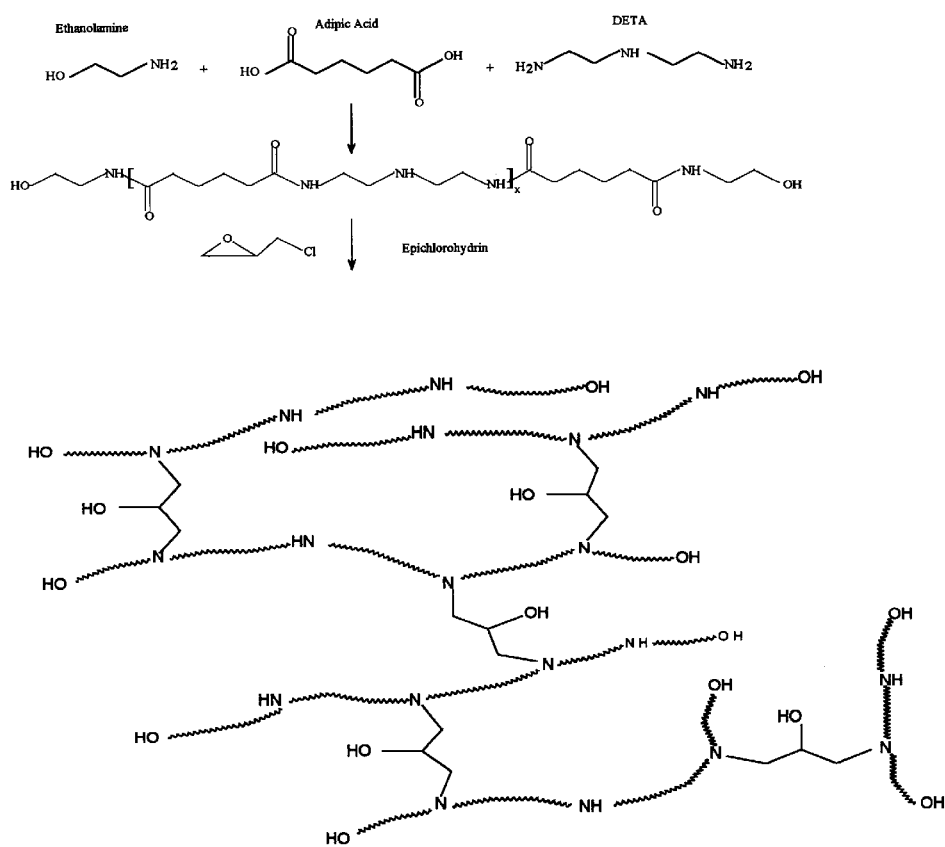
FIG. 2 is a representation of the various reaction steps for the formation of an intralinked polyamidoamines of the invention and a representation of an idealized structure of the intralinked polyamidoamine.

FIG. 2 is a schematic representation of various reaction steps for formation of the intralinked polyamidoamines of the invention and a representation of an idealized structure of the intralinked polyamidoamine.

The cationic polyamidoamine epichlorohydrin resin is synthesized by first producing a polyamidoamine and subsequently alkylating and crosslinking the polyamidoamine with epichlorohydrin. The polyamine comprising a polyalkylenepolyamine, containing from two to four ethylene groups, two primary amine groups, and one to three secondary amine groups may be selected from the group consisting of diethylenetriamine (DETA), triethylenetetraamine and tetraethylenepentamine is charged into a reaction vessel. While the polyamine is being mixed, a dicarboxylic acid containing three to ten carbon atoms, preferably adipic acid is added to the reactor over a period of time and the temperature of the reactants is allowed to rise. The temperature of the reactants is maintained below about 125° C. during this stage of the reaction. The temperature of the reactants is then raised to about 170° C. and an amount of water contained in the reactants is driven off. At this stage in the reaction, polymerization to polyamidoamine is essentially complete.

An amount of water is added to the reactor, and the resultant polyamidoamine is stirred until it dissolves in the water. The amount of water added to the reactor is not critical to the process.

The aqueous polyamidoamine solution is to have an RSV of less than about 0.125 dl/g.

An amount of the aqueous polyamidoamine solution is charged into a reaction vessel and diluted with water. The total aqueous polyamidoamine solution is not critical. An amount of an epihalohydrin, preferably epichlorohydrin, is charged into the reaction vessel and then the temperature of the reactants is raised to about 45° C. to about 70° C., preferably about 52° C. to about 62° C., more preferably about 57 to about 58° C. The viscosity of the solution is monitored. When a viscosity is achieved which is indicative of the desired level of reaction of the polyamidoamine with the epihalohydrin, the reaction is stopped by diluting the polymer with cold water. Alternatively, the reaction can be stopped through the adjustment of the pH of the solution with a mineral acid to a pH of about 3.5.

The final solids of the resultant cationic solution is from about 5 to about 30, preferably about 10 to 25, more preferably about 15 to about 18.

Alternatively, the cationic component may comprise an intralinked polyamidoamine. The intralinked polyamidoamine preferably comprises the reaction product of an endcapped polyamidoamine prepolymer and the at least one intralinker. The endcapped polyamidoamine prepolymer itself preferably comprises the reaction product of the at least one dicarboxylic acid or dicarboxylic acid derivative, at least one polyamine, and at least one endcapping agent. The dicarboxylic acids and dicarboxylic acid derivatives of the intralinked polyamidoamine comprise two amidization reactive carboxyl (i.e., —COOH) groups.

Suitable dicarboxylic acids for the intralinked polyamidoamine include the $C_2$–$C_{12}$ dicarboxylic acids. Particular dicarboxylic acids which are suitable include oxalic, malonic, succinic, glutaric, adipic, pimelic, suberic, azelaic, sebacic, maleic, fumaric, itaconic, phthalic, isophthalic, and terephthalic acids.

Suitable dicarboxylic acid derivatives for the intralinked polyamidoamine include dicarboxylic acid esters and dicarboxylic acid halides. Preferred derivatives are the esters.

Dicarboxylic acid esters which may be used include esters of the $C_2$–$C_{12}$ dicarboxylic acids, and especially the $C_1$–$C_3$ diesters of these acids. Particular diesters which are suitable include dimethyl adipate, dimethyl malonate, diethyl malonate, dimethyl succinate, and dimethyl glutarate.

Appropriate dicarboxylic acid halides include adipoyl chloride, glutaryl chloride, and sebacoyl chloride.

The polyamines of the intralinked polyamidoamine comprise at least two amidization reactive amine groups. Preferably, the amidization reactive amine groups are primary amine groups.

Also as a matter of preference, the intralinked polyamidoamine further comprise at least one intralinker reactive amine group. The intralinker reactive amine groups are preferably secondary and/or tertiary amine groups.

Suitable polyamines include the polyalkylene polyamines including those having at least two primary amine groups and also at least one secondary and/or at least one tertiary amine group. Especially preferred polyamines, including the polyalkylene polyamines, are those having two primary amine groups and also at least one secondary and/or at least one tertiary amine group. Particular suitable polyamines include diethylenetriamine (DETA), triethylenetetramine (TETA), tetraethylenepentamine (TEPA), iminobispropylamine (IBPA), N-methyl-bis-(aminopropyl)amine (MBAPA), and bis-hexamethylenetriamine (BHMT).

Endcapping agents are understood as including whatever attaches to or reacts with the dicarboxylic acid, dicarboxylic acid derivative or polyamine or attaches to or reacts with dicarboxylic acid or polyamine residues and thereby prevents the further reaction of these reactants and residues. Particularly, it is further amidization reactions of these reactants and residues which are prevented.

Suitable endcapping agents for the intralinked polyamidoamine include the monofunctional amines, the monofunctional carboxylic acids, and the monofunctional carboxylic acid esters. It is understood that the monofunctional amines are those amines having only one amidization reactive amine group, that the monofunctional carboxylic acids are those carboxylic acids having only one amidization reactive carboxyl group, and that the monofunctional carboxylic acid esters are those carboxylic acid esters having only one amidization reactive ester group.

Suitable monofunctional amines include monofunctional primary amines, including monoalkyl amines and monoalkanol amines, and monofunctional secondary amines, including dialkyl amines and dialkanol amines.

Among the monofunctional primary amines which are suitable are butylamine, ethanolamine (i.e., monoethanolamine, or MEA), cyclohexylamine, 2-methylcyclohexylamine, 3-methylcyclohexylamine, 4-methylcyclohexylamine, benzylamine, isopropanolamine (i.e., monoisopropanolamine), mono-sec-butanolamine, 2-amino-2-methyl-1-propanol, tris(hydroxymethyl) aminomethane, tetrahydrofurfurylamine, furfurylamine, 3-amino-1,2-propanediol, 1-amino-1-deoxy-D-sorbitol, and 2-amino-2-ethyl-1,3-propanediol. Among the monofunctional secondary amines which are suitable are diethylamine, dibutylamine, diethanolamine (i.e., DEA), di-n-propylamine, diisopropanolamine, di-sec-butanolamine, and N-methylbenzylamine.

Monofunctional carboxylic acids which are suitable for the intralinked polyamidoamine include benzoic acid, 2-hydroxybenzoic acid (i.e., salicylic acid), 3-hydroxybenzoic acid, acetic acid, phenylacetic acid, propionic acid, butyric acid, valeric acid, caproic acid, caprylic acid, oleic acid, ortho-toluic acid, meta-toluic acid, and para-toluic acid, ortho-methoxybenzoic acid, meta-methoxybenzoic acid, and para-methoxybenzoic acid.

Monofunctional carboxylic acid esters which are suitable for the intralinked polyamidoamine include methyl acetate, ethyl acetate, methyl benzoate, ethyl benzoate, methyl propionate, ethyl propionate, methyl butyrate, ethyl butyrate, methyl phenyl acetate, and ethyl phenyl acetate.

Intralinkers appropriate for the intralinked polyamidoamine include compounds having two, or at least two sites which are reactive with intralinker reactive amine groups in the prepolymer, and which thereby connect prepolymer chains to provide the desired branching. In this context, the intralinker reactive amine groups are understood as including the prepolymer secondary and tertiary amine groups which react with the intralinkers.

These intralinkers accordingly link the prepolymer to provide the high molecular weight, highly branched, intralinked polymers or resins. In this regard, the intralinking which characterizes the intralinked polymers is the intramolecular connection of prepolymer chains by intralinker; this intralinking does not encompass intermolecular connections between discrete polymer molecules.

The intralinking of the intralinked polyamidoamine is accordingly distinguished from crosslinking, which is understood as referring to the indicated intermolecular connections. In resins of the prior art, compounds which serve as intralinkers for the intralinked polyamidoamine can serve to crosslink polymer molecules; this crosslinking is absent, or substantially or essentially absent, from the intralinked polyamidoamines.

Suitable intralinkers include haloalklyene oxides. These include epihalohydrins, i.e., epichlorohydrin, epibromohydrin, epiiodohydrin, and epifluorohydrin and alkyl-substituted epihalohydrins. Also included are 1-bromo-3,4-epoxybutane, chloroepoxyhexane, and iodoepoxyisobutane. Diepoxides, including ethylene glycol diglycidyl ether (i.e., EGDGE) and 1,4-butanediol diglycidyl ether (i.e., BDDGE), are also suitable. 1,2,7,8-diepoxyoctane, 3-(bis(glycidoxymethyl)-methoxy)-1,2-propanediol, 1,4-cyclohexanedimethanol diglycidyl ether, 4-vinyl-1-cyclohexene diepoxide, 1,2,5,6-diepoxycyclooctane, and bisphenol A diglycidyl ether may also be used.

Yet additional suitable intralinkers are diacrylates, dimethacrylates, diacrylamides, and dimethacrylamides which are reactive, with the intralinker reactive amine groups of the prepolymer, by a Michael reaction. Examples are ethylene glycol diacrylate, ethylene glycol dimethacrylate, 1,4-butanediol diacrylate, 1,4-butanediol dimethacrylate, tripropylene glycol diacrylate, tripropylene glycol dimethacrylate, triethylene glycol diacrylate, triethylene glycol dimethacrylate, 1,6-hexanediol diacrylate, 1,6-hexanediol dimethacrylate, N,N'-methylenebisacrylamide, N,N'-methylenebismethacrylamide, N,N'-(1,2-dihydroxyethylene)bisacrylamide, and N,N'-(1,2-dihydroxyethylene)bismethacrylamide.

The prepolymer is preferably a controlled, low molecular weight prepolymer. The prepolymer is also preferably an endcapped prepolymer. Further as a matter of preference, the prepolymer is a polyamidoamine. The polyamidoamine prepolymer is preferably obtained by a polycondensation reaction of the dicarboxylic acid, polyamine, and endcapping agent.

The diacid, polyamine, and endcapping agent undergo amidization, i.e., carboxyl groups and amine groups of these reactants react to form amide functionalities. In this context, amidization reactions are understood as including condensation reactions of the diacid and polyamine, particularly, reaction of diacid carboxyl groups with polyamine primary amine groups in formation of prepolymer chains. Amidization reactions are also understood as including reactions of endcapping agents with prepolymer chain end groups particularly, reaction of monofunctional carboxylic acid carboxyl groups with prepolymer primary amine groups, and reaction of the amine groups of monofunctional amines with prepolymer carboxyl groups to form endcapped prepolymer.

Further in this context, amidization reactive groups are understood as including the carboxyl and amine groups of the diacids, polyamines, and endcapping agents which undergo the amidization reactions. Particularly as to the polyamines, the amidization reactive groups are understood as including the primary amine groups of the polyamines.

One or more of each of the acid, polyamine, and endcapping agent may be employed in the polycondensation; further, one or more dicarboxylic acid derivatives may be used in place of, or in addition to, the dicarboxylic acid. Particularly as to endcapping agent, one or more monofunctional amines and/or one or more monofunctional carboxylic acids may be used.

The volatility of the endcapping agent should be low enough so that this agent remains in the prepolymerization reaction at the temperature at which the reaction is being conducted. Particularly, when the prepolymer is prepared by thermally driven polycondensation, volatility is a significant feature of the endcapping agent; in this instance, an endcapping agent of lesser volatility is preferred. The boiling point of the endcapping agent should be high enough so that, at the temperature being employed to drive off the condensation product, i.e., water where a diacid reactant is used, and alcohol in the case of diester, the agent is not also removed.

Considering the foregoing, for diacids, particularly where the diacid and polyamine are adipic acid and DETA, prepolymerization will customarily be conducted at about 150–180° C., more preferably, about 160–170° C. In this instance the endcapping agent should therefore have a boiling point above 180° C., or above 170° C., in the case of the indicated 160–170° C. range, so that it is not driven off with the water.

Where diester is used instead of diacid, and the resulting alcohol condensation product is more volatile than water, an endcapping agent of greater volatility may be used. Because not as high a temperature is required for removing the alcohol, the endcapping agent can correspondingly have a lower boiling point without being taken off.

The polycondensation reaction of dicarboxylic acid and/or derivative, polyamine, and endcapping agent provides a prepolymer comprising polymer chains which include alternating dicarboxylic and polyamine residues, and which are terminated by endcaps. It is understood that the dicarboxylic and polyamine residues are the units remaining after the amidization reactions of dicarboxylic acid and/or derivative with polyamine to form the prepolymer chains, and that the endcaps also are residues, i.e., the units remaining after reaction of endcapping agent with prepolymer chain end groups.

By virtue of the presence of the endcapping agent in the prepolymerization polycondensation reaction of the intralinked polyamidoamine, the prepolymer is endcapped. Amine and carboxyl functionality are therefore preferably absent, or at least essentially absent or at least substantially absent, from the chain ends of the endcapped prepolymer, i.e., the endcapped prepolymer is free, or at least essentially or at least substantially free, of amine and carboxyl end groups.

Accordingly, the intralinked polyamidoamine is preferably characterized by endcaps lacking both carboxylic and amine functionality. The monofunctional amine endcapping agents react with carboxyl groups of the forming prepolymer, while monofunctional carboxylic acid endcapping agents react with prepolymer amidization reactive amine groups; in both instances, the result is an amide endcap. The endcaps of the prepolymer are therefore preferably amide endcaps.

It is understood that the polyamidoamine prepolymers or intralinked polyamidoamines are "endcapped" when they comprise an endcap, as discussed herein. Particularly, they are endcapped when they comprise a residue (reaction product) of an endcapping agent.

The molecular weight of the prepolymer can be controlled by the relative amounts of the dicarboxylic acid, polyamine, and endcapping agent employed in the polycondensation reaction. Particularly, it is the use of endcapping agent which allows for control of the prepolymer molecular weight.

In this regard, where the endcapping agent is a monofunctional carboxylic acid, during prepolymerization it is competing with the dicarboxylic acid to react with the polyamine, and with amine end groups in the growing prepolymer chain. If it is the diacid which reacts, polymerization continues; however, amidization with the endcapping agent forms an endcap, stopping the chain growth.

Conversely, if a monofunctional amine is the endcapping agent, competition is with the polyamine reactant.

The more endcapping agent which is employed relative to its competing reactant, the lower will be the molecular weight of the resulting prepolymer. Particularly, the more one of the diacid and polyamine reactants is replaced by its competing endcapping agent, the lower the prepolymer molecular weight will be. In this manner, a prepolymer of predetermined molecular weight can be provided.

The relative proportions of diacid, polyamine, and endcapping agent employed in the prepolymerization reaction are preferably such that the total number of amidization reactive carboxyl groups contributed by these reactants is equal, or at least substantially equal or essentially equal, to the total number of amidization reactive amine groups which are contributed; accordingly, the ratio of the total number of these amidization reactive carboxyl groups to the total number of amidization reactive amine groups is preferably 1:1, or about 1:1. This correspondence between amidization reactive carboxyl and amine groups is necessary so that endcapping of the prepolymer will likewise be complete, or at least substantially complete or essentially complete.

Therefore, where the endcapping agent is a monofunctional carboxylic acid, the relative proportions of diacid, polyamine, and endcapping agent will be such that the total number of amidization reactive carboxyl groups contributed by the diacid and the endcapping agent together will be equal, or at least substantially equal or essentially equal, to the number of amidization reactive amine groups contributed by the polyamine. And where the endcapping agent is a monofunctional amine, the relative proportions of diacid, polyamine, and endcapping agent will be such that the total number of amidization reactive amine groups contributed by the polyamine and the endcapping agent together will be equal, or at least substantially equal or essentially equal, to the number of amidization reactive carboxyl groups contributed by the diacid.

Specifically, taking a 1:1 molar ratio of diacid and polyamine as the starting point, preferably two moles, or about two moles, of the endcapping agent are employed in place of one mole of whichever of the diacid and polyamine is its competing reactant. Accordingly, if the endcapping agent is a monofunctional carboxylic acid, it should be considered that two moles, or about two moles, of this acid is replacing each mole of the diacid in a 1:1 molar ratio of diacid and polyamine. Conversely, if the endcapping agent is a monofunctional amine, it should be considered that two moles, or about two moles, of this amine is replacing each mole of the polyamine in the indicated 1:1 diacid/polyamine molar ratio.

The molecular weight of the prepolymer can be measured as RSV. Prepolymer molecular weight can also be expressed in terms of $DP_n$, which is the number-average degree of polymerization, or the average number of subunits in a polymer chain. Particularly for the endcapped prepolymer of the present invention, the subunits include the following:

the amidoamine subunits, each of these units being a single diacid residue linked to a single polyamine residue; and taken as one subunit, the two endcaps and the single excess residue which remains after apportioning the other diacid and polyamine residues into amidoamine subunits.

The $DP_n$ of the prepolymer is additionally defined by the formula $$Dp_n = (1+r)/(1-r)$$

where r is defined as the ratio of the monomer units, and is itself calculated as follows:

where A>B, $$r = A/(B+2C)$$

where B>A, $$r = B/(A+2C)$$

The quantity r is always less than 1.

A, B, and C represent the molar proportions of diacid, polyamine, and endcapping agent, respectively. These quantities are further defined by the following relationships:

where A>B, $$C = 2(A-B)$$

where B>A, $$C = 2(B-A)$$

Where A is greater than B, C is monofunctional amine; where B is greater than A, C is monofunctional carboxylic acid. A and B are never equal.

The prepolymer has a $Dp_n$ preferably of about 2 to about 50, more preferably of about 3 to about 25. As a matter of particular preference, the $Dp_n$ of the prepolymer is about 3 to 10.

Where $DP_n=2$, $r=1/3$ (0.333). Where $DP_n=50$, $r=49/51$ (0.961). Table 1 below shows the different values of r, A, B, and C for $DP_n$ equal to 2 and $DP_n$ equal to 50—depending upon whether there is a molar excess of diacid to polyamine (i.e., A>B), with the endcapping agent therefore being monofunctional amine, or a molar excess of polyamine to diacid (i.e., B>A), with the endcapping agent therefore being monofunctional acid.

TABLE 1

|  | $DP_n$ | r | A | B | C |
|---|---|---|---|---|---|
| Monofunctional amine; A > B | 50 | 0.961 | 1.000 | 0.986 | 0.028 |
| Monofunctional amine; A > B | 2 | 0.333 | 1.000 | 0.333 | 1.334 |
| Monofunctional acid; B > A | 50 | 0.961 | 0.986 | 1.000 | 0.028 |
| Monofunctional acid; B > A | 2 | 0.333 | 0.333 | 1.000 | 1.334 |

The amine functionality-free and carboxyl functionality-free endcaps for the prepolymer are preferred to provide the desired high molecular weight, highly branched (i.e., hyperbranched) polymers, preferably, high molecular weight, highly branched (i.e., hyperbranched) polyamidoamines. Amine functionality in the chain end groups of the completed prepolymer is disadvantageous because amine end groups will react with the intralinker to give chain extension, rather than the desired branching. This chain extension would cause the resin final product to be excessively linear.

Further, carboxyl functionality in the chain end groups of the completed prepolymer also is disadvantageous because carboxyl end groups will react with polymer chain secondary amines. The likely result will be gelling; in any case, the final product would be unsuitable.

It is preferred that control of prepolymer molecular weight be accomplished by endcapping, as discussed herein. If instead of including endcapping agent in the polycondensation reaction, the molecular weight of the prepolymer is controlled by limiting the amount of diacid reactant relative to polyamine (i.e., employing an excess of polyamine in the prepolymerization), then the resulting prepolymer will be characterized by a preponderance of primary amine end groups. Conversely, if prepolymer molecular weight is controlled by limiting the amount of polyamine reactant relative to diacid (i.e., employing an excess of diacid in the prepolymerization), then the resulting prepolymer will be characterized by a preponderance of carboxyl end groups. The disadvantages of amine and carboxyl end groups in the prepolymer are as has been discussed.

Further, where a low molecular weight prepolymer is provided, it is possible to obtain a more highly branched, intralinked final resin product, particularly, a more highly branched, intralinked polyamidoamine resin. Specifically, the lower the molecular weight of the prepolymer, the greater the amount of branching can be provided in the final product.

The amount of intralinker used for preparing the intralinked polyamidoamine is that which is sufficient to provide a high molecular weight, highly branched resin, but which is also low enough so that all, or essentially all or substantially all, of the intralinker is serving to intralink prepolymer, or is fully reacted, i.e., leaving the intralinked resin free, or essentially free or substantially free, of reactive intralinker functionality.

Expressed in terms of prepolymer molecular weight, the intralinker is preferably present, in the intralinked polyamidoamine, in an amount wherein the mole ratio of intralinker, to intralinker reactive amine groups in the endcapped prepolymer, is between about $\frac{1}{2}[1/(DP_n-1)]$ and about $1/(DP_n-1)]$. More preferably, the intralinker is present in an amount wherein the mole ratio of intralinker, to intralinker reactive amine groups in the endcapped prepolymer, is equal to $1/(DP_n-1)$, or about $1/(DP_n-1)$.

In this regard, the $1/(DP_n-1)$ value, at the upper end of the indicated $\frac{1}{2}[1/(DP_n-1)]$ to $1/(DP_n-1)]$ range, is optimal because it represents the highest proportion of intralinker employed with a given prepolymer molecular weight. At a particular prepolymer molecular weight, the more intralinker which may be employed, the greater the degree of the desired branching is achieved.

Also as a matter of preference, the intralinker is preferably present, in the intralinked polyamidoamine, in an amount wherein the mole ratio of intralinker, to intralinker reactive amine groups in the endcapped prepolymer, is between about 0.02 and about 0.5. Expressed in terms of mole percent, the intralinker is preferably present, in the intralinked polyamidoamine, in an amount wherein the mole percent of intralinker, based on moles of intralinker reactive amine groups in the endcapped prepolymer, is between about 2 percent and about 50 percent.

More preferably, the intralinker is present in an amount wherein the mole ratio of intralinker, to intralinker reactive amine groups in the endcapped prepolymer, is between about 0.04 and about 0.5, i.e. about 4 to about 50 mole percent intralinker. As a matter of particular preference, the intralinker is present in an amount wherein the mole ratio of intralinker, to intralinker reactive amine groups in the endcapped prepolymer, is between about 0.1 and about 0.5, i.e. about 10 to about 50 mole percent.

It is understood that by moles of intralinker reactive amine groups, it is meant the total number of amine groups in the prepolymer that are reactive with the intralinker.

Reactive intralinker functionality is understood as referring to intralinker which is appended to but is not linking prepolymer, because not all of the intralinker reactive sites have reacted with intralinker reactive amine groups of the prepolymer. For instance, where epichlorohydrin is the intralinker, two possible types of reactive intralinker functionality are azetidinium and aminochlorohydrin groups.

The lower the molecular weight of the prepolymer, the more intralinker is required to achieve the requisite high molecular weight through branching. However, the maximum amount of intralinker which can be employed is that which can be reacted with the prepolymer and still leave the intralinked resin free, or essentially free or substantially free, of reactive intralinker functionality. This maximum amount of intralinker is also that amount which can be reacted with the prepolymer without causing the resin to gel, or without resulting in a thermosetting resin.

In this regard, gelling and thermosetting of polyamidoamine resins result from the presence of reactive intralinker functionality. Both gelling and thermosetting entail the formation of intermolecular connections between discrete resin molecules. Gelling and thermosetting are caused by reaction between reactive intralinker functionality and intralinker reactive amine groups of different resin molecules; the reactive intralinker functionality crosslinks the different molecules, and these molecules accordingly form an interconnected structure which is insoluble.

Particularly in the case of a thermosetting resin, the act of heating and/or drying the resin hardens it, as well as rendering it insoluble. In the prior art, resin solutions are acid stabilized, so that heating will not gel or thermoset the resin.

In contrast, the intralinked polyamidoamine is non-gelling and non-thermosetting. With all or essentially all or substantially all of the intralinker already reacted to link prepolymer, the dearth of reactive intralinker functionality precludes, or at least greatly limits, reaction between the discrete resin molecules. The intralinked polyamidoamine can accordingly be redissolved after drying and/or heating.

Reactive intralinker functionality can be ascertained by NMR. Particularly, this analytical technique is suitable for confirming the absence, or substantial or essential absence, of this functionality from intralinked polyamidoamine.

An idealized representation of the structure which characterizes the resin, where the resin has been prepared from dicarboxylic acid or dicarboxylic acid derivative, polyalkylene polyamine, monoalkanolamine, and epihalohydrin is shown in FIG. 2. The indicated high branching and lack of reactive intralinker functionality are displayed in this structure; it is understood that FIG. 2 is not intended to be an accurate representation of the complete molecular structure of the resin.

To prepare the prepolymer from diacid, polyamine, and endcapping agent, a mixture of these three reactants is heated at a temperature of about 160–170° C. for about ½–4 hours, at atmospheric pressure; where a reduced pressure is employed, lower temperatures may be utilized. This polycondensation reaction produces water as a byproduct, which is removed by distillation. At the end of this reaction, the resulting product is dissolved in water at a concentration of about 50% by weight total polymer solids.

Where diester is used instead of diacid, the prepolymerization can be conducted at a lower temperature, specifically, about 110° C. at atmospheric pressure. In this case, the byproduct is an alcohol with the type of alcohol dependent upon the identity of the diester. For instance, where a dimethyl ester is employed the alcohol byproduct will be methanol, while ethanol will be the byproduct obtained from a diethyl ester.

An aqueous solution of the prepolymer is reacted with intralinker to obtain the intralinked polyamidoamine. The prepolymer and intralinker are mixed with an appropriate amount of dilution water, to provide a reaction solution having a concentration of about 30% by weight total solids (prepolymer+intralinker). This mixture is then maintained at a temperature of about 25–80° C., still more preferably about 50–70° C., and most preferably about 60° C.

The viscosity of the mixture is monitored, using Gardner-Holdt viscosity tubes. The reaction is continued until viscosity reaches a particular value, preferably, "L" on the Gardner-Holdt scale at which point cold dilution water is added to end the reaction. Alternatively, the reaction may be diluted with warm water, with the heating being continued until the viscosity again builds to the "L" level; several such iterations can be performed before the reaction is ended.

Whether the cationic component is a cationic polyamidoamine epichlorohydrin polymer or an intralinked polyamidoamine, or mixtures thereof, the cationic component is used in combination with an anionic polymer or an amphoteric polymer to produce the dry-strength system of the invention.

The anionic component comprises an anionic component consisting of copolymers of acrylamide and at least one member selected from the group consisting of acrylic acid, itaconic acid, methacrylic acid and 2-acrylamido-2-methyl-1-propanesulfonic acid and salts thereof. Alternatively, the anionic component comprises an anionic component selected from the group consisting of carboxylmethylcellulose, carboxymethyl guar, alginic acid, pectin, poly(2-acrylamido-2-methyl-1-propanesulfonic acid), and salts thereof. Preferably, the salts of the anionic component are the sodium salts thereof.

Alternatively, the anionic component may be an amphoteric polymer having a net negative charge. The amphoteric polymer comprising a polymer of acrylamide, at least one anionic monomer selected from the group consisting of acrylic acid, itaconic acid, methacrylic acid and 2-acrylamido-2-methyl-1-propanesulfonic acid and salts thereof and at least one cationic monomer selected from the group consisting of methacryloyloxyethyltrimethylammonium chloride (MTMAC), methacryloyloxyethyltrimethylammonium sulfate (MTMMS), acryloyloxyethyltrimethylammonium chloride (ATMAC), methacryloyloxyethylbenzyldimethylammonium chloride (MBMAC), dimethylaminoethylmethacrylate (DMAEMA) and salts thereof, 3-(methacrylamido)propyltrimethylammonium chloride (MAPTAC), diallyldimethylammonium chloride (DADMAC), and diallyldiethylammonium chloride (DADEAC).

The various embodiments of the anionic component may be used by themselves or in combination with one another.

Also useful are anionically-modified forms of lignin and cellulose, such as are obtained, e.g., by oxidation, sulfonation or carboxymethylation. Oxidized and sulfonated lignins and celluloses are naturally present as by-products of the pulping process and are normally present in unbleached pulps useful in this invention. The naturally present lignins and hemicellulose may also be modified by synthetic processes such as oxidation, sulfonation and carboxymethylation.

The process for manufacturing paper comprises three principal steps: (1) forming an aqueous suspension of cellulose fibers; (2) adding a strengthening additive; and (3) sheeting and drying the fibers to form paper.

The step of forming an aqueous suspension of cellulosic fibers is performed by conventional means, such as known mechanical, chemical and semi-chemical, etc., pulping processes. Alternatively, a suspension may be formed by repulping paper or paperboard. After the mechanical grinding and/or chemical pulping step, the pulp may be washed to remove residual pulping chemicals and solubilized wood components. These steps are well known, as described in, e.g., Casey, Pulp and Paper (New York, Interscience Publishers, Inc. 1952).

The step of adding the strengthening additive, e.g. the dry-strength system may be carried out either as individual components or as a blend of anionic components and cationic resins directly to the papermaking system.

The step of sheeting and drying of the fibers to form paper is carried out according to conventional means, such as those described in Casey, Pulp and Paper, cited above.

The specific amount and the type of the additives will depend on, among other things, the type of pulp characteristics. The ratios of anionic and cationic resins in the dry-strength system may range from about 1/20 to 20/1, preferably from about 4/1 to 1/4, and most preferably from about 2/3 to 3/2. The preferable level of addition of the combination is about 0.1 to 2% based on the dry-weight of the pulp.

The cationic component of the invention may be added at a level of about 0.025% to about 1.0% by weight of the paper, preferably about 0.05% to about 0.5% by weight of the paper, more preferably about 0.1% to about 0.3% by weight of the paper.

The anionic component of the invention may be added at a level of about 0.025% to about 1.0% by weight of the paper, preferably about 0.05% to about 0.5% by weight of the paper, more preferably about 0.1% to about 0.3% by weight of the paper.

The dry-strength system of the invention may also comprise a cationic starch. The cationic starch may be added at a level of about 0.15% to about 2.0% by weight of the paper, preferably about 0.25% to about 1.5% by weight of the paper, more preferably about 0.5% to about 1.25% by weight of the paper. The cationic starch may be any cationic starch used in the paper-making process. The cationic starch may be selected form the group consisting of potato starch, tapioca starch, wheat starch, corn starch and other cationic starches derived from waxy maize. Cationic starches of use in the instant invention are described in U.S. Pat. No. 4,643,801 incorporated herein by reference in its entirety.

The dry-strength system of the invention may also comprise a wet-strength resin. The wet-strength resin may be added at such levels to the paper so as not to significantly increase the paper's wet-strength. The dry-strength system of this invention may also be used to enhance the dry-strength of wet-strengthened papers. A wet-strength resin can then be added to at such levels to provide only the needed amount of wet-strength, and the dry-strength system of this invention can be used to increase the dry-strength without further increasing the wet-strength. Some examples of wet-strength resins available from Hercules Incorporated are Kymene® 557H resin, Kymene® 736 resin, Kymene® 450 resin, Kymene® 557LX resin and Kymene® Plus resin. The wet-strength resin may be added at a level of about 0.025% to about 1.5% by weight of the paper, preferably about 0.05% to about 1.0% by weight of the paper, more preferably about 0.075% to about 0.75% by weight of the paper. Polyamidoamine epichlorohydrin ("PAE") resins are the most preferred wet-strength resins. Most preferred is Kymene® 557H resin, in which adipic acid is reacted with diethylenetriamine (DETA) to form a polyamidoamine that is alkylated and crosslinked with epichlorohydrin to form a PAE resin, namely, adipic acid-DETA polyamidoamine epichlorohydrin. Alternatively, the wet-strength resin may comprise an aldehyde-functionalized starch or a glyoxal-modified polyacrylamide resin.

Since the additive combinations of the invention include two or more components, they can be added to the furnish in different ways that may affect the rate of production in the plant and the properties of the final product. These additives can be introduced into the wet-end system by combining the anionic and cationic resins beforehand and adding the resulting mixture to the wet end of the papermaking system.

The dry-strength system of the invention may also be used in paper which contain a retention aid. The retention aid may be a high molecular weight polyacrylamide or a high molecular weight flocculent. Alternatively, the retention aid may be poly(ethyleneoxide). Alternatively, the retention aid may be a microparticulate retention aid. The microparticulate retention aid may be selected from the group consisting of bentonite and colloidal silica. Alternatively, the microparticulate retention aid may comprise a synthetic polymeric microparticle.

The dry-strength system of the invention may also be used in paper which contains a highly cationic material for charge control or for fine particle retention. The highly cationic material for charge control may be selected from the group consisting of alum, polyaluminum chloride, poly (diallyldimethylammonium) chloride, poly(dialkylamine-epichlorohydrin) and polyethyleneimine.

Other additives useful in the papermaking process of this invention include sizes, defoamers, fillers, wetting agents, optical brighteners, inorganic salts, etc.

The dry-strength system of the invention is of utility in many types of paper. The dry-strength system of the invention is of particular utility in papers selected from the group consisting of bleached board, linerboard, corrugating medium, newsprint, printing and writing paper, tissue and towel. The dry-strength system of the invention is preferably used in recycled liner board and recycled corrugating medium.

The method for the determination of a polymer's RSV is as follows:

The reduced viscosity of a 2% solution of polymer in 1 N ammonium chloride is determined at 25.0° C. by means of a Ubbelohde viscometer and a Brinkmann Viscotimer. Flow times of the 2% polymer solution and the pure solvent are measured and the relative viscosity (Nrel) calculated. The reduced viscosity is calculated from the relative viscosity. This method is based on ASTM D446.

Apparatus (1) Ubbelohde Viscometer tubes, No. 1, with Viscometer Constant C=0.01—available from Visco Systems, Yonkers, N.Y., or Schott, Hofheim, Germany, or Brinkmann Instruments.
(2) Brinkmann Viscotimer C—available from Brinkmann Instruments Inc., Cantiague Rd., Westbury, N.Y. 11590.
(3) Ubbelohde Viscometer Support—ibid., Cat. No. 21-00-032-9.
(4) Constant temperature water bath maintained at 25+/−0.1° C. Cooling capability (cold water or ice pack) may be necessary to maintain constant temperature. An ASTM 45 C. thermometer should be used to monitor the temperature near the viscometer tube mounting location.
(5) Volumetric flask, 50 mL, Class A.
(6) Beaker, 10 mL.
(7) ASTM 45 C. thermometer, calibrated, designed for measurements at 25° C. with 0.05 degree divisions—available from VWR Scientific, Cat. No. 61118-923, or equivalent.
(8) Source of vacuum—Preferably a water aspirator for cleaning of viscometers.
(9) Filter or stainless steel screen, ca. 100 mesh.

Reagents (1) Ammonium chloride, granular. ACS reagent grade.
(2) Solvent (1 N ammonium chloride). Add 53.5+/−0.1 g of NH$_4$Cl to a 1-liter volumetric flask, dilute to volume with distilled water and mix.

Ammonium Chloride Flow Measurement

The ammonium chloride flow time should be measured once per day that Polymer RV measurements are made. This value should be used in the RV calculation.

(1) Mount the viscometer in the 25° C. constant temperature bath in a vertical position and allow it to equilibrate for at least 15 minutes. The bath must be at 25+/−0.1° C.
(2) Fill the viscometer with ammonium chloride solvent, through tube "L", so that the level of liquid falls between the marks on bulb "A". Place the viscometer in the constant temperature bath and allow to stand for at least 5 minutes in order to reach the correct temperature.
(3) Connect the Ubbelohde viscometer to the Viscotimer with the attached tubing. Turn the Viscotimer on and allow it to run.
(4) Measure and record at least 3 flow times. Calculate the average of three measurements that agree within 0.2 seconds. If after 4 measurements, agreement is not reached, clean the viscometer tube and measure the flow times again.
(5) Clean and dry the viscometer.

Polymer Flow Measurement (1) Determine the total solids content of the polymer.
(2) Calculate the amount of polymer required for 1.000+/−0.020 g of solids using Equation 1.
(3) Weigh, to the nearest 0.0001 g, the appropriate amount of sample, calculated in Step 2, into a 50 mL volumetric flask. Alternately, the sample can be weighed into a small beaker and quantitatively transferred to the 50 mL volumetric flask with 4 or 5 washings of ammonium chloride solution.
(4) Add 20–25 mL of 1 N ammonium chloride to the flask and gently swirl until the sample has completely dissolved. Then add ammonium chloride solution to within ¼" of the mark.
(5) Place the flask and contents in the 25° C. constant temperature bath and allow the temperature to equilibrate for at least 15 minutes.
(6) Mount the viscometer in the 25° C. constant temperature bath in a vertical position and allow it to equilibrate for at least 15 minutes. The bath must be at 25+/−0.1° C.
(7) Slowly make up to the volume mark with more solvent and finally mix to obtain complete homogeneity. This will give a 2.000+/−0.040% solution. Calculate the actual concentration to the Polymer solution, to the nearest 0.001 g/100 mL.
(8) After equilibration of the polymer solution and adjustment to volume at 25° C., filter the solution through a 100 mesh stainless steel screen or comparable pore size filter.
(9) Fill the viscometer through tube "L" so that the level of liquid falls between the marks on bulb "A". Place the viscometer in the constant temperature bath and allow to stand for at least 5 minutes in order to reach the correct temperature.
(10) Connect the Ubbelohde viscometer to the Viscotimer with the attached tubing. Turn the Viscotimer on and allow it to run.
(11) Measure and record at least 3 flow times. Calculate the average of three measurements that agree within 0.2 seconds. If after 4 measurements, agreement is not reached, clean the viscometer tube and measure the flow times again. Prepare a fresh solution if agreement still cannot be obtained.

(12) Clean the viscometer immediately after use.

(13) Calculate the relative viscosity (Nred) of the polymer using Equation 3 and the reduced viscosity (Nred) using Equation 4.

Calculation $$100/TS = Ws \qquad \text{Eq(1)}$$

where:

TS=% total solids of Polymer

Ws=weight of sample required for 1.000+/−0.020 g of solids $$(Ws \times TS)/50 = Cp \qquad \text{Eq(2)}$$

where:

Ws=actual weight of Polymer sample

TS=% total solids of Polymer

50=mL of diluted Polymer solution

Cp=concentration of Polymer solution, g/100 mL $$t_s/t_o = N\text{rel} \qquad \text{Eq(3)}$$

where:

$t_s$=average flow time of the 2% sample solution at 25° C. sec.

$t_o$=average flow time of the solvent at 25° C., sec.

Nrel=relative viscosity $$(N\text{rel}-1)/Cp = RSV \qquad \text{Eq(4)}$$

where:

Nrel=relative viscosity

Cp=concentration of the polymer solution in grams of polymer solids per 100 mL of solution.

RSV=reduced specific viscosity

Note: Carry out this value to the nearest 0.001 unit.

The following examples will serve to illustrate the invention, parts and percentages being by weight unless otherwise indicated.

EXAMPLES

Example 1

This example demonstrates synthesis of the cationic resin (polyamidoamine epichlorohydrin resin).

A. Preparation of the polyamidoamine: 412.8 g (four moles) of high purity diethylenetriamine (DETA) was charged into a reaction vessel. While stirring, 584.4 g (four moles) of adipic acid was added during a period of thirty (30) minutes with the temperature rising to 115° C. The temperature was kept below 125° C. during this period. The temperature was then raised to 170° C. and the water driven off collected until 116 cc of water was collected. At this point, 850 cc of water was added and the resultant polymer was stirred until it dissolved. The resulting polymer solution had a total solids of 50–52% and an RSV of 0.083 to 0.094 dl/g.

B. Preparation of cationic polymer: 2524.8 g of a 50.5% solution of the polymer made in the preparation step, was added to a reaction vessel and diluted with water to a total weight of 4581 g and having a total solids of 27.8%. 138.2 g (1.49 moles) of epichlorohydrin were added all at once to the reaction vessel and then the temperature was raised to 57–58° C. The Gardner-Holdt viscosity was monitored and when the Gardner viscosity of "L" was reached. The reaction was stopped by diluting the polymer to 5% solids with cold water. Alternatively, the polymer could be diluted to about 20% solids and the pH adjusted to about 3.5 to stop the reaction. This yielded a final product with a Brookfield viscosity of 5–10 cps. at 5% solids.

Example 2

This example demonstrates the use of the cationic polymer as the cationic component of a dry-strength system with an anionic polymer.

Corrugated containers were repulped and refined to 400 ml. Canadian Standard Freeness. This pulp was used to make handsheets at 80 lbs/3,000 sq. ft basis weight with 1% alum at a pH of about 6. The anionic component of the dry-strength system was an anionic polyacrylamide (Hercobond® 2000 resin available from Hercules Incorporated). The anionic polyacrylamide was added to the pulp after the alum and before the cationic polymer.

Sheets were wet pressed to 38% solids and dried on a drum drier, then allowed to age for two weeks to allow full development of strength of those sheets containing a conventional wet-strength resin (Kymene® 557H wet-strength resin, available from Hercules Incorporated). The polymer addition rates in the table below are in dry weight percent of conditioned handsheet weight of 80 lbs.

In all the examples, the following test methods were used. The tensile test used was TAPPI test method T494. The Mullen burst was determined using TAPPI test method T807 The Ring Crush was determined using TAPPI test method T818. Concora was determined using TAPPI test method T824. The STFI short span compression strength was determined using TAPPI test method T826.

| Run No. | Hercobond ® 2000 resin % | Cationic polymer, % | Mullen Burst, psi | Ring Crush, lbs | STFI short span compression strength | Dry Tensile, lbs/in | CONCORA (Fluted edge crush), lbs |
|---|---|---|---|---|---|---|---|
| 1 | 0 | None | 40.1 | 34.1 | 16.9 | 29.9 | 62.0 |
| 2 | 0.1 | $A^1$, 0.1 | 47.1 | 37.1 | 17.8 | 34.1 | 66.2 |
| 3 | 0.1 | A, 0.2 | 49.7 | 40.9 | 17.3 | 32.0 | 71.9 |
| 4 | 0.1 | A, 0.3 | 50.7 | 43.5 | 17.6 | 32.6 | 82.7 |
| 5 | 0.1 | $B^2$, 0.1 | 52.7 | 42.2 | 17.3 | 33.3 | 77.4 |
| 6 | 0.1 | B, 0.2 | 54.1 | 45.4 | 17.8 | 35.5 | 74.4 |
| 7 | 0.1 | B, 0.3 | 59.3 | 28.5 | 18.3 | 35.6 | 79.3 |
| 8 | 0.1 | $C^3$, 1.0 | 54.8 | 44.3 | 17.6 | 34.1 | 68.8 |
| 9 | 0.1 | C, 0.5 | 49.7 | 35.9 | 17.1 | 34.1 | 63.9 |

-continued

| Run No. | Hercobond ® 2000 resin % | Cationic polymer, % | Mullen Burst, psi | Ring Crush, lbs | STFI short span compression strength | Dry Tensile, lbs/in | CONCORA (Fluted edge crush), lbs |
|---|---|---|---|---|---|---|---|
| 10 | 0 | C, 1.0 | 52.9 | 43.6 | 18.3 | 34.8 | 72.6 |
| 11 | 0.1 | D[4], 0.05 | 42.0 | 38.9 | 16.8 | 31.0 | 64.7 |
| 12 | 0.1 | D, 0.1 | 43.8 | 35.4 | 16.5 | 31.0 | 66.7 |

[1]A = Cationic polymer of Example 1
[2]B = Kymene ® 557H wet-strength resin (available from Hercules Incorporated)
[3]C = Sta-Lok ® 430 cationic starch (available from A. E. Staley Co.)
[4]D = Reten ® 203 poly(diallyldimethylammonium chloride) (available from Hercules Incorporated)

The results found in the above table indicate a positive contribution of dry-strength from the polyamidoamine resin of the invention. Its performance was similar to the contribution to dry-strength from Kymene® 557H wet-strength resin or cationic starch with Hercobond® 2000 resin. By contrast, poly(diallyldimethylammonium chloride) retention aid in combination with the Hercobond® 2000 resin contributed relatively little to dry-strength.

Example 3

This example demonstrates the use of the cationic polymer of Example 1 as a cationic component for a dry-strength system with an anionic polymer with various levels of alum at approximately pH 7.

Old corrugated containers were repulped and refined to 400 ml. Canadian Standard Freeness and made into paper with a basis weight of 80 lb/3000 sq.ft. on a pilot paper machine. Alum, if used was added to the stock pump supplying 1% consistency stock to the machine. The anionic polymer, a polyacrylamide (Hercobond® 2000 resin, available from Hercules Incorporated) was added to an inline mixer. The cationic polymer was added to the fan pump. The strength values in the table below are corrected to 80 lb/3000 sq. ft. basis weight. The values for tensile, ring crush, and STFI compression strength are the geometric mean values of the machine direction (MD) and cross direction (CD) values.

The results demonstrate that with alum and Hercobond® 2000 resin present, the polyamidoamine/epichlorohydrin resin of the invention provides a significant improvement in ring crush and short span compression strength.

Example 4

This example demonstrates the use of the cationic polymer of Example 1 as the cationic polymer component of a dry-strength system with an anionic polymer or an amphoteric polymer with alum at a pH of approximately 6 or without alum at a pH of approximately 8.

As in Example 3, old corrugated containers were repulped and refined to 400 ml. Canadian Standard Freeness and were made into 80 lb/3000 sq. ft. paper on a pilot paper machine. Alum, if used, was added to the discharge of the machine chest. The pH was controlled by added NaOH or $H_2SO_4$ as needed before the stock pump. Anionic polymers were added to the stock via inline mixers followed by the cationic polymer to another inline mixer. The values for tensile, ring crush, and STFI compression strength are the geometric mean values of the machine direction (MD) and cross direction (CD) values.

| Alum, % | Hercobond ® 2000 resin % | Cationic polymer % | Mullen psi | Tensile lbs/in | Ring Crush lbs | STFI short span compression, lbs/in |
|---|---|---|---|---|---|---|
| 0 | 0 | 0 | 57.9 | 30.2 | 31.9 | 14.9 |
| 0 | 0 | B[2], 0.3 | 65.1 | 36.1 | 33.7 | 16.0 |
| 0 | 0 | A[1], 0.3 | 60.6 | 32.9 | 34.1 | 15.1 |
| 0 | 0.3 | B, 0.3 | 63.1 | 34.6 | 32.6 | 16.3 |
| 0 | 0.3 | A, 0.3 | 59.9 | 31.9 | 34.4 | 15.5 |
| 0.5 | 0.15 | B, 0.15 | 65.1 | 34.0 | 34.9 | 16.0 |
| 0.5 | 0.15 | A, 0.15 | 56.6 | 31.5 | 33.3 | 15.7 |
| 1 | 0 | 0 | 57.6 | 28.8 | 33.4 | 15.0 |
| 1 | 0 | B, 0.3 | 65.3 | 33.4 | 35.2 | 15.8 |
| 1 | 0 | A, 0.3 | 55.9 | 30.4 | 33.1 | 14.7 |
| 1 | 0.3 | B, 0.3 | 61.4 | 32.0 | 37.5 | 16.4 |
| 1 | 0.3 | A, 0.3 | 61.1 | 32.7 | 35.5 | 15.5 |

[1]Polymer A is the polyamidoamine of Example 1
[2]Polymer B is Kymene ® 557H wet-strength resin (available from Hercules Incorporated)

| pH | Alum % | Anionic Polymer, % | Cationic Polymer, % | Mullen psi | Ring Crush lbs | STFI Short Span Compression lbs/in | Tensile, lbs/in |
|---|---|---|---|---|---|---|---|
| 8 | 0 | 0 | 0 | 46.4 | 32.8 | 13.6 | 26.2 |
| 8 | 0 | $Y^3$, 0.1 | $B^2$, 0.2 | 53.4 | 32.6 | 14.3 | 28.1 |
| 8 | 0 | Y, 0.2 | B, 0.2 | 53.1 | 32.7 | 14.3 | 28.5 |
| 8 | 0 | Y, 0.3 | B, 0.2 | 54.0 | 30.6 | 14.0 | 28.8 |
| 8 | 0 | $Z^4$, 0.3 | B, 0.2 | 55.8 | 36.5 | 14.1 | 29.1 |
| 8 | 0 | Z, 0.2 | B, 0.2 | 50.3 | 34.9 | 14.0 | 29.3 |
| 8 | 0 | Z, 0.1 | B, 0.2 | 51.4 | 33.1 | 13.9 | 29.3 |
| 8 | 0 | 0 | 0 | 48.7 | 31.0 | 13.9 | 25.9 |
| 8 | 0 | Y, 0.1 | $A^1$, 0.2 | 49.0 | 34.6 | 13.8 | 25.5 |
| 8 | 0 | Y, 0.2 | A, 0.2 | 48.1 | 36.3 | 13.3 | 24.9 |
| 8 | 0 | Y, 0.3 | A, 0.2 | 48.6 | 36.0 | 13.5 | 24.8 |
| 8 | 0 | Z, 0.3 | A, 0.2 | 51.6 | 33.8 | 13.9 | 24.8 |
| 8 | 0 | Z, 0.2 | A, 0.2 | 50.1 | 37.4 | 14.1 | 25.5 |
| 8 | 0 | Z, 0.1 | A, 0.2 | 50.2 | 34.9 | 13.6 | 26.4 |
| 8 | 0 | Z, 0.1 | $C^5$, 1.0 | 58.9 | 41.6 | 14.4 | 29.0 |
| 8 | 0 | Z, 0.2 | C, 1.0 | 58.2 | 35.6 | 14.6 | 28.3 |
| 8 | 0 | Z, 0.3 | C, 1.0 | 59.7 | 41.5 | 14.8 | 28.0 |
| 6 | 1 | 0 | 0 | 48.1 | 34.4 | 12.4 | 25.0 |
| 6 | 1 | Y, 0.1 | B, 0.2 | 56.4 | 33.1 | 13.9 | 28.3 |
| 6 | 1 | Y, 0.2 | B, 0.2 | 57.8 | 36.1 | 14.1 | 28.7 |
| 6 | 1 | Y, 0.3 | B, 0.2 | 57.4 | 35.4 | 14.0 | 28.4 |
| 6 | 1 | Z, 0.3 | B, 0.2 | 56.8 | 33.9 | 14.2 | 29.0 |
| 6 | 1 | Z, 0.2 | B, 0.2 | 57.2 | 35.2 | 13.9 | 28.4 |
| 6 | 1 | Z, 0.1 | B, 0.2 | 55.1 | 34.0 | 13.5 | 29.0 |
| 6 | 1 | 0 | 0 | 49.2 | 31.8 | 13.2 | 24.2 |
| 6 | 1 | Y, 0.1 | A, 0.2 | 51.1 | 34.4 | 14.1 | 27.1 |
| 6 | 1 | Y, 0.2 | A, 0.2 | 53.6 | 37.3 | 14.3 | 27.0 |
| 6 | 1 | Y, 0.3 | A, 0.2 | 50.6 | 34.5 | 14.3 | 26.9 |
| 6 | 1 | Z, 0.3 | A, 0.2 | 55.2 | 36.4 | 14.4 | 28.4 |
| 6 | 1 | Z, 0.2 | A, 0.2 | 55.4 | 43.0 | 14.6 | 27.9 |
| 6 | 1 | Z, 0.1 | A, 0.2 | 53.7 | 34.5 | 14.7 | 26.9 |

[1] Polymer A was the polyamidoamine of Example 1
[2] Polymer B was Kymene ® 557H wet-strength resin
[3] Polymer Y was Hercobond ® 2000 resin
[4] Polymer Z was an amphoteric polymer (acrylamide-co-MTMAC-co-acrylic acid)
[5] Polymer C was Sta-Lok 400 cationic starch (available from A. E. Staley)

The results of this example demonstrate higher strength than the control at both pH 8 without alum and at pH 6 with alum. The results at pH 6 with alum and the amphoteric acrylamide resin were nearly equal to the results with Kymene® 557H wet-strength resin under similar conditions.

Example 5

This example demonstrates the synthesis of prepolymers for the intralinked polyamidoamines of the invention.
Synthesis of the Prepolymers For the prepolymers of Examples 5A and 5B, the polyamine and the monoethanolamine endcapping agent were added to a 2,000 ml. resin kettle fitted with a condenser, Dean-Stark trap, thermocouple, addition funnel, and mechanical stirrer. Stirring of this mixture was then initiated, and the adipic acid was cautiously added during the stirring; the temperature of the reaction mixture was maintained below 125° C. by controlling the rate at which the adipic acid was added.

After the addition of the adipic acid was completed, the temperature was raised to 169–171° C., and maintained in this range for 4 hours. During this period water of distillation was removed through the Dean-Stark trap.

Hot water (~70° C.) was cautiously added to the product, which was stirred until the prepolymer was dissolved.

The table below sets forth the amounts of reactants employed in preparing the prepolymers of Examples 5A and 5B, as well as the actual and theoretical water of distillation, the amount of hot water added during the synthesis, and the solids content of the product. The table also lists theoretical and actual molecular weight values (provided as $DP_n$ and RSV respectively) for the resulting prepolymers.

| Ex. | Theo. $DP_n$ | Moles Adipic | Moles Polyamine | Moles MEA | RSV (dl/g)[1] | Theo. W. of Dist. | Actual W. of Dist. | Added Hot Water | Solids |
|---|---|---|---|---|---|---|---|---|---|
| 5A | 9 | 3 | 2.75 DETA | 0.5 | 0.0932 | 108 ml | 101 ml | 450 ml | 59.7% |
| 5B | 6 | 2 | 1.60 TEPA | 0.8 | 0.1207 | 72 ml | 54.5 ml | 570 ml | 50.8% |

[1] Measured at 25° C. in 1.0M $NH_4Cl$ @ a concentration of 2.00 g/dl.

The above table demonstrates the variation between theoretical and actual molecular weight for prepolymers of use in the invention. The theoretical molecular weight is set forth as $DP_n$; the actual molecular weight is stated as reduced specific viscosity, measured as deciliters per gram (dL/g) at 25° C. in 1.0 M $NH_4Cl$ at a concentration of 2.00 g/dL.

Example 6

The prepolymers of Example 5 were further reacted in the following manner. For Examples 6A and 6B, the reaction was conducted as a single step. Specifically, cold dilution water was added to cool the reaction to room temperature when the terminal viscosity was reached.

At the point of terminal viscosity, the reaction was diluted with cold water, and cooled to room temperature. A light gold product was obtained.

The table below sets forth the amounts of prepolymer (g/g solids/eq) and intralinker (g/moles) employed in preparing the intralinked polyamidoamines of Examples 6A and 6B. The table also sets forth the solids content, pH, and Brookfield viscosity ("B.V.") (in centipoise) of the product, as well as the above-noted Gardner-Holdt reaction points and reduced specific viscosity of the resin.

Further in the following table, the Max.% intralinker value also denotes the amount of intralinker used in the foregoing Examples; yet additionally, it is the maximum amount of the intralinker which can be reacted with the indicated prepolymer, without causing the resin to gel or resulting in a resin with reactive intralinker functionality. This measurement is accordingly provided as a mole percent of the intralinker, based on the intralinker reactive amine groups in the prepolymer—i.e., it is calculated as the molar percent of the indicated intralinker reactive amine functionality. The resulting value expresses, as a percentage, the relationship of moles of intralinker per mole of intralinker reactive amine groups in the prepolymer.

paper and the resin was complete. The paper was then conditioned under standard conditions and wet and dry tensile was measured.

| Resin | Amount, % | Dry Tensile, lbs./in | Wet Tensile lbs./in | Wet Tensile as % of Dry Tensile |
|---|---|---|---|---|
| None | 0.0 | 15.1 | 0.51 | 3 |
| Kymene ® 577H wet-strength resin | 0.5 | 18.0 | 2.99 | 17 |
| Kymene ® 577H wet-strength resin | 1.0 | 18.6 | 3.82 | 21 |
| Kymene ® 577H wet-strength resin | 2.0 | 20.0 | 4.84 | 24 |
| 7A | 0.5 | 16.2 | 1.08 | 7 |
| 7A | 1.0 | 16.5 | 1.34 | 8 |
| 7A | 2.0 | 18.2 | 1.88 | 10 |
| 7B | 0.5 | 15.7 | 0.78 | 5 |
| 7B | 1.0 | 15.4 | 0.86 | 6 |
| 7B | 2.0 | 16.8 | 0.94 | 6 |
| 7C | 0.5 | 16.3 | 1.04 | 6 |
| 7C | 1.0 | 16.7 | 1.28 | 8 |
| 7C | 2.0 | 16.6 | 1.42 | 9 |

Where resin 7A was a hyperbranched polyamidoamine made from a prepolymer composed of adipic acid, diethylenetriamine (DETA), and ethanolamine with a reduced specific viscosity of 0.0844 deciliters per gram, with 25 mole % epichlorohydrin. Resin 7B was a hyperbranched polyamidoamine made for the same prepolymer as resin 7A with 17.5 mole % epichlorohydrin. Resin 7C is a hyperbranched polyamidoamine made from a prepolymer composed of adipic acid, DETA and ethanolamine with a

| Example Number | Prepol Ex. # | Prepolymer; g/g solids/eq[1] | Intralinker; g/moles[2] | Max. % Intralinker | Water (ml) | Time; min.[3] | Resin Gardner-Holdt | Added Water (ml) | B.V. (cPs) | Resin RSV(dl/g)[4] | pH | Solids |
|---|---|---|---|---|---|---|---|---|---|---|---|---|
| 6A | 5A | 91.72/54.76/0.225 | 3.64/0.0394 epi | 15.7% Epi | 100 | 128 | L | 150 | 30.6 | 0.3415 | 8.82 | 16.1% |
| 6B | 5B | 98.23/49.90/0.50 | 3.47/0.0375 epi | 7.5% Epi | 80 | 240 | G | 30 | 36.1 | 0.2334 | 9.27 | 22.0% |

[1]Grams of prepolymer solution/grams of solid prepolymer/total equivalents of intralinker reactive amine in prepolymer.
[2]Grams intralinker/moles intralinker; epi = epichlorohydrin; EGD = ethylene glycol diglycidyl ether; BDD = 1,4-butanediol diglycidyl ether; CHD = 1,4-cyclohexanedimethanol diglycidyl ether.
[3]Time for reaction mixture to reach viscosity after temperature reaches 60° C.
[4]Measured at 25° C. in 1.0M $NH_4Cl$ at a concentration of 2.00 g/dl.
[5]Reaction was run at 50° C. instead of 60° C.

As evidenced in the above table, the maximum amount of intralinker which can be employed, without causing gelling or resulting in reactive intralinker functionality, increases as the prepolymer molecular weight decreases.

Example 7

This example demonstrates the use of the intralinked polyamidoamine as the cationic component in a dry-strength system.

Water leaf (no internal sizing and no surface treatment) paper made from 50% hardwood and 50% softwood and with a basis weight of 40 lbs per 3,000 square feet was passed through a size press where resins were added from dilute solutions. The amount of resin added was determined by weighing the sheets of paper dry before and after the size press treatment. The paper was then cured for 30 minutes in an oven at 80° C. to insure that any reaction between the paper and the resin was complete.

reduced specific viscosity of 0.0841 deciliters per gram, with 17.5 mole percent epichlorohydrin.

Wet-strength from normally anticipated amounts of these polymers used in dry-strength applications at less than 0.25% should be repulpable by comparison with Kymene® 577H wet-strength resin and the blank (no additives) paper.

Example 8

This example demonstrates the use of cationic polyamidoamine epichlorohydrin polymer as the cationic component in a dry-strength system.

Resin 8A was a cationic polyamidoamine epichlorohydrin polymer as in Example 1 with a viscosity of 8.52 cps. Resin 8B was a cationic polyamidoamine epichlorohydrin polymer as in Example 1 with a viscosity of 12.5 cps.

Handsheets were made from 50% bleached hardwood, 50% bleached softwood pulp refined to 487 ml. Canadian Standard Freeness. The handsheet system was a Noble and Wood type with sheets made at a basis weight of 40 lbs per 3,000 square feet. The resins were added to the proportioner of the handsheet system. The paper was cured in an oven at 80° C. for 30 minutes before being conditioned for tensile testing. The results are found in the following table.

| Resin | Amount, % | Dry Tensile, lbs/in | Wet Tensile lbs/in | Wet Tensile as % of Dry Tensile |
|---|---|---|---|---|
| 8A | 0.25 | 16.9 | 1.02 | 6.1 |
| 8A | 0.50 | 17.3 | 1.49 | 8.6 |
| 8A | 0.75 | 16.8 | 1.71 | 10.1 |
| 8B | 0.25 | 17.0 | 1.10 | 6.5 |
| 8B | 0.50 | 17.7 | 1.60 | 9.0 |
| 8B | 0.75 | 17.9 | 1.85 | 10.3 |
| Kymene® 577H wet-strength resin | 0.25 | 20.4 | 3.57 | 17.5 |
| Kymene® 577H wet-strength resin | 0.50 | 20.9 | 4.48 | 21.4 |
| Kymene® 577H wet-strength resin | 0.75 | 21.1 | 5.08 | 24.1 |

The paper containing the wet-strength for normally anticipated amounts of cationic polyamidoamine epichlorohydrin polymer of the invention in a dry-strength application of 0.75% or less, will repulpable by comparison with the results from an equivalent amount of Kymene® 577H wet-strength resin as indicated by the paper's wet tensile value.

Example 9

This example demonstrates the use of intralinked polyamidoamines as the cationic component of a dry-strength system with an anionic polymer The subject resins of the invention as in example 6 were listed in the following table used with Hercobond® 2000 acrylamide/acrylic acid copolymer (available from Hercules Incorporated) to enhance the strength of paper made with recycled unbleached draft. The source of the unbleached kraft was repulped box cuttings screened and refined to 400 ml. Canadian Standard Freeness.

The 80 lb/3000 sq. ft. paper was made at a pH of approximately 6 with 1% alum added to the thick stock of the pilot paper machine before any other additives were added to the stock. This was followed by 0.3% Hercobond® 2000 acrylamide/acrylic acid copolymer in all runs, then the cationic resin(s) either alone of in combinations of a cationic resin with a conventional wet-strength resin Kymene® 557H resin (available from Hercules Incorporated). Paper samples were aged at 25° C. for at least two weeks before testing to insure that the resins used were fully cured.

STFI is the short span compression strength of the board. Ring crush is the edgewise compression strength. The geometric mean ("GM") was used to combine the machine direction ("MD") and cross direction ("CD") results for comparison.

| Run | Added at Fan Pump | % level | Added at Fan Pump | % level | G.M. STFI % of Blank | G.M. Ring Crush % of Blank | G. M. Tensile % of Blank |
|---|---|---|---|---|---|---|---|
| 1 | | | | | 100.00 | 100.00 | 100.00 |
| 2 | 557H | 0.10 | | | 101.49 | 108.29 | 112.78 |
| 3 | " | 0.20 | | | 105.94 | 110.72 | 109.08 |
| 4 | " | 0.30 | | | 109.52 | 111.43 | 111.46 |
| 5 | | | 6B | 0.10 | 102.46 | 103.81 | 109.84 |
| 6 | | | " | 0.20 | 109.50 | 113.11 | 108.86 |
| 7 | | | 6B | 0.30 | 103.45 | 95.38 | 103.42 |
| 8 | 557H | 0.075 | 6B | 0.225 | 106.11 | 109.80 | 100.57 |
| 9 | " | 0.15 | " | 0.15 | 106.30 | 110.63 | 98.82 |
| 10 | " | 0.225 | " | 0.075 | 106.28 | 103.92 | 97.11 |
| 11 | | | 6A | 0.10 | 99.19 | 103.87 | 101.23 |
| 12 | | | " | 0.20 | 105.88 | 117.82 | 110.42 |
| 13 | | | " | 0.30 | 111.87 | 110.85 | 108.13 |
| 14 | 557H | 0.075 | 6A | 0.225 | 104.60 | 113.71 | 107.32 |
| 15 | " | 0.15 | " | 0.15 | 103.51 | 103.02 | 113.64 |
| 16 | " | 0.225 | " | 0.075 | 103.73 | 114.81 | 115.49 |
| 17 | | | Reten 203 | 0.10 | 99.35 | 94.72 | 101.16 |
| 18 | | | " | 0.20 | 101.48 | 95.63 | 97.31 |
| 19 | | | " | 0.30 | 104.42 | 101.36 | 99.02 |
| 20 | 557H | 0.075 | Reten 203 | 0.225 | 108.19 | 102.31 | 101.71 |
| 21 | " | 0.15 | " | 0.15 | 104.18 | 98.46 | 104.58 |
| 22 | " | 0.225 | " | 0.075 | 106.19 | 99.34 | 109.06 |

From these results, it can be seen that the resins of the invention offer acceptable dry-strength, comparable to the conventional wet-strength resin Kymene® 557H resin. The resins exhibited lower wet-strength when compared to conventional wet-strength resin Kymene® 557H resin. This lower wet-strength will permit paper manufactures to more easily repulp paper containing these resins when compared to paper made with Kymene® 557H resin.

Example 10

The same resins of the invention used in the previous Example were used to strengthen paper as in the previous example. Resin E, a polyamidoamine of 1.6 moles tetraethylenepentamine and 2 moles adipic acid endcapped with 0.8 moles of ethanolamine. 49.9 grams of this material as a 50.8% solids solution (98.2 g of solution) were reacted with 4.05 g of epichlorohydrin to produce the inventive polymer. In this example, the resins of the invention were used with or without an acrylamide/acrylic acid copolymer (Hercobond® 2000 resin available from Hercules Incorporated) and with and without alum.

epichlorohydrin polymer as in example 1, having 18% solids and a pH of 5.0 adjusted with phosphoric acid to reduce the viscosity of the amphoteric polyacrylamide, originally 7,800 cps. and increase the cationic charge in the system.

The results of compatibility testing at room temperature were as follows:

| Run | Pulp Batch | Added at Stock Pump Mixer | % Level | Added at Second Mixer | % Level | Added at Fan Pump Inlet | % Level | Mullen Burst % of Blank | GM Tensile % of Blank | GM Ring Crush % of Blank | GM STFI % of Blank |
|---|---|---|---|---|---|---|---|---|---|---|---|
| 1  | 1 | ALUM | 1.0  |         |      |        |      | 99.4  | 95.4  | 104.6 | 100.8 |
| 2  | 2 | "    | 1.0  |         |      |        |      | 92.1  | 97.0  | 97.4  | 97.7  |
| 3  | 1 |      |      | BLANK   |      |        |      | 100.0 | 100.0 | 100.0 | 100.0 |
| 4  | 2 |      |      | "       |      |        |      | 100.0 | 100.0 | 100.0 | 100.0 |
| 5  | 2 |      |      | HB-2000 | 0.3  |        |      | 100.7 | 97.9  | 105.9 | 98.5  |
| 6  | 1 |      |      | "       | 0.3  |        |      | 103.4 | 98.2  | 96.2  | 99.1  |
| 7  | 2 | ALUM | 1.0  | HB-2000 | 0.3  |        |      | 99.9  | 101.0 | 101.7 | 99.6  |
| 8  | 2 | "    | 1.0  | "       | 0.3  |        |      | 102.2 | 97.8  | 95.2  | 98.8  |
| 9  | 1 | ALUM | 0.5  | HB-2000 | 0.15 | K-557H | 0.15 | 112.4 | 112.4 | 109.4 | 107.3 |
| 10 | 2 | "    | 0.5  | "       | 0.15 | "      | 0.15 | 113.5 | 107.3 | 109.4 | 102.3 |
| 11 | 2 |      |      |         |      | K-557H | 0.3  | 117.1 | 118.1 | 118.7 | 112.3 |
| 12 | 1 |      |      |         |      | "      | 0.3  | 112.3 | 119.5 | 105.6 | 107.5 |
| 13 | 2 | ALUM | 1.0  |         |      | K-557H | 0.3  | 108.4 | 114.1 | 109.6 | 104.6 |
| 14 | 1 | "    | 1.0  |         |      | "      | 0.3  | 112.7 | 110.7 | 110.5 | 105.8 |
| 15 | 2 |      |      | HB-2000 | 0.3  | K-557H | 0.3  | 115.7 | 109.2 | 111.1 | 106.3 |
| 16 | 1 |      |      | "       | 0.3  | "      | 0.3  | 109.0 | 114.5 | 102.3 | 109.3 |
| 17 | 2 | ALUM | 1.0  | HB-2000 | 0.3  | K-557H | 0.3  | 113.6 | 106.4 | 118.2 | 111.6 |
| 18 | 2 | "    | 1.0  | "       | 0.3  | "      | 0.3  | 114.9 | 108.7 | 112.0 | 102.8 |
| 19 | 2 | ALUM | 0.5  | HB-2000 | 0.15 | 6A     | 0.15 | 103.8 | 104.5 | 109.4 | 102.7 |
| 20 | 2 |      |      |         |      | 6A     | 0.3  | 102.9 | 102.9 | 108.6 | 104.8 |
| 21 | 2 | ALUM | 1.0  |         |      | 6A     | 0.3  | 102.0 | 102.5 | 101.6 | 100.3 |
| 22 | 2 |      |      | HB-2000 | 0.3  | 6A     | 0.3  | 108.9 | 107.9 | 106.5 | 103.8 |
| 23 | 2 | ALUM | 1.0  | HB-2000 | 0.3  | 6A     | 0.3  | 103.3 | 103.3 | 109.7 | 106.2 |
| 24 | 1 | ALUM | 0.5  | HB-2000 | 0.15 | 6B     | 0.15 | 110.2 | 102.4 | 109.8 | 101.9 |
| 25 | 1 |      |      |         |      | 6B     | 0.3  | 101.6 | 105.8 | 110.8 | 103.8 |
| 26 | 1 | ALUM | 1.0  |         |      | 6B     | 0.3  | 96.0  | 99.5  | 105.8 | 102.5 |
| 27 | 1 |      |      | HB-2000 | 0.3  | 6B     | 0.3  | 107.8 | 109.6 | 110.6 | 101.8 |
| 28 | 2 | ALUM | 1.0  | HB-2000 | 0.3  | 6B     | 0.3  | 95.0  | 100.1 | 109.1 | 108.5 |

As can be seen in the above table, the conventional wet-strength resin Kymene® 557H resin was effective in a dry-strength system but can be expected to produce wet-strength in the paper. Hercobond® 2000 resin, either by itself or with alum, did not increase the dry-strength of the paper. Combinations of the highly branched intralinked polyamidoamine resins with Hercobond® 2000 resin exhibit improved ring crush of the recycled liner board.

Example 11

An amphoteric polyacrylamide having 17.8% solids exhibiting a viscosity of from about 8,000 to 12,000 cps was mixed with a sample of the cationic polyamidoamine

| Time (days) | 20% Ex. 1/ 80% amphoteric acrylamide | 30% Ex 1./ 70% amphoteric acrylamide |
|---|---|---|
| 1  | 3,330 cps | 2,060 cps |
| 6  | 3,787 cps | 2,136 cps |
| 13 | 3,887 cps | 2,444 cps |
| 20 | 3,810 cps | 2,467 cps |
| 67 | 5,373 cps | 3,628 cps |

Viscosity was measured with a Brookfield LVT viscometer with a number three spindle. Viscosity of 3,330 cps and below was measured at 30 rpm, others at 12 rpm. Viscosity was measured at a sample temperature of 25° C.

Visual inspection of the mixed polymer solutions after 20 days showed uniform smooth solutions with no visible signs of gelation. Based on the stable viscosity after 13 days, that compatible mixtures of the two polymer solutions can be made that will be less viscous and more cationic than the original starting amphoteric polyacrylamide.

It is not intended that the examples presented here should be construed to limit the invention, but rather, they are submitted to illustrate some of the specific embodiments of the invention. Various modifications and variations of the present invention can be made without departing from the scope of the appended claims.

We claim:

1. A dry-strength system for paper comprising:
   a cationic component and an anionic component wherein the cationic component comprises a reaction product of an intralinker and a polyamidoamine, and wherein the polyamidoamine prior to reacting with the intralinker has a reduced specific viscosity of less than about 0.125 dl/g and wherein the intralinker to amine is in a ratio of 0.10:1 to about 0.40:1 on a molar basis and wherein the intralinker is selected from the group consisting of epihalohydrins and diepoxides.

2. The dry-strength system for paper of claim 1 wherein the intralinker comprises epihalohydrin.

3. The dry-strength system of paper of claim 2 wherein the epihalohydrin is selected from the group consisting of epilorohydrin, epibromohydrin, and epifluorohydrin and alkyl-substituted epihalohydrins.

4. The dry-strength system for paper of claim 2 wherein the epihalohydrin comprises epichlorohydrin.

5. The dry-strength system for paper of claim 1 wherein the intralinker comprises epihalohydrin.

6. The dry-strength system for paper of claim 1 wherein the polyamidoamine prior to reacting with the intralinker has a reduced specific viscosity of about 0.05 to about 0.125 dl/g.

7. The dry-strength system for paper of claim 1 wherein the ratios of anionic components to cationic components range from about 1:20 to 20:1.

8. A dry-strength system for paper comprising:
   a cationic component and an anionic component
   wherein the cationic component comprises a reaction product of an intralinker and a polyamidoamine, and wherein the polyamidoamine prior to reacting with the intralinker has a reduced specific viscosity of less than about 0.125 dl/g and wherein the intralinker to amine is in a ratio of about 0:75:1 or less on a molar basis and wherein the intralinker is selected from the group consisting of epihalohydrins and diepoxides; and
   wherein the anionic component comprises a copolymer of acrylamide and at least one member selected from the group consisting of acrylic acid, itaconic acid, methacrylic acid and 2-acrylamido-2-methyl-1-propanesulfonic acid and salt thereof; carboxymethylcellulose; carboxymethyl guar; alginic acid; pectin; poly(2-acrylamodo-2-methyl-1-propanesulfonic acid), and salts thereof; and an amphoteric polymer.

9. The dry-strength system of claim 8 wherein the amphoteric polymer comprises a polymer of acrylamide, at least one anionic monomer selected from the group consisting of acrylic acid, itaconic acid, methacrylic acid and 2-acrylamido-2-methyl-1-propanesulfonic acid and salts thereof and at least one cationic monomer selected from the group consisting of methacryloxloxyethyltrimethylammonium chloride, methacryloyloxyethyltrimethylammonium sulfate, acryloyloxethyltrimethylammonium chloride, ethacryloyloxyethylbenzyldimethylammonium chloride, dimethylaminoethylmethacrylate and salts thereof, 3-(methacrylamido)propyltrimethylammonium chloride, diallydimethylammonium chloride, and diallydiethylammonum chloride.

10. The dry-strength system of claim 9 wherein the amphoteric polymer comprises a polymer of acrylamide, methacryloyloxyethyltrimethylammonium chloride and acrylic acid.

11. A dry-strength system for paper comprising:
    a cationic component comprises a reactionproduct of an intralinker and a polyamidoamine, and wherein the polyamidoamine prior to reacting with the intralinker has a reduced specific viscosity of less than about 0.125 dl/g and wherein the intralinker to amine is in a ratio of about 0.75:1 or less on a molar basis and wherein the intralinker is selected from the group consisting of epihalohydrins and diepoxides; and
    wherein the anionic component comprises and anionically-modified form of lignin wherein the anionically modified form of lignin comprises oxidized, sulfonated or carboxymethylated lignin.

12. A dry-strength system for paper comprising:
    a cationic component and an anionic component
    wherein the cationic component comprises a reaction product of an intralinker and a polyamidodmaine, and wherein the polyamidomaine prior to reacting with the intralinker has a reduced specific viscosity of less than about 0.125 dl/g and wherein the intralinker to amine is in a ratio of about 0.75:1 or less on molar basis and wherein the intralinker is selected from the group consisting of epichalohydrins and diepoxides; and
    wherein the anionic component comprises an anionically-modified form of cellulose comprises oxidized, sulfonated or carboxymethylated cellulose.

13. The dry-strength system for comprising:
    a cationic component and an anionic component wherein the cationic component comprises a reaction product of an intralinker and a polyamidoamine, and wherein the polyamidoamine prior to reacting with the intralinker has a reduced specific viscosity of less than about 0.125 dl/g and wherein the intralinker to amine is in a ratio of about 0.75:1 or less on a molar basis and wherein the intralinker is selected from the group consisting of epihalodyrins and diepoxides; and wherein the dry-strength system further comprises cationic starch.

14. The dry-strength system of claim 13 wherein the cationic starch is selected from the group consisting of potato starch, tapioca starch, wheat starch, corn starch and other cationic starches derived from waxy maize.

* * * * *